US010126464B2

United States Patent
Nielsen et al.

(10) Patent No.: US 10,126,464 B2
(45) Date of Patent: Nov. 13, 2018

(54) MARINE STREAMER HANDLING

(71) Applicant: PGS Geophysical AS, Oslo (NO)

(72) Inventors: Einar Nielsen, Bekkestua (NO); Karl Petter Elvestad, Trogstad (NO)

(73) Assignee: PGS Geophysical AS, Oslo (NO)

( * ) Notice: Subject to any disclaimer, the term of this patent is extended or adjusted under 35 U.S.C. 154(b) by 204 days.

(21) Appl. No.: 15/087,745

(22) Filed: Mar. 31, 2016

(65) Prior Publication Data

US 2017/0176637 A1    Jun. 22, 2017

Related U.S. Application Data (60) Provisional application No. 62/268,077, filed on Dec. 16, 2015.

(51) Int. Cl.
*G01V 13/00* (2006.01)
*B63B 23/70* (2006.01)
*G01V 1/38* (2006.01)

(52) U.S. Cl.
CPC .............. *G01V 13/00* (2013.01); *B63B 23/70* (2013.01); *G01V 1/3808* (2013.01); *B63B 2211/02* (2013.01)

(58) Field of Classification Search
CPC ... B66D 1/36; B66D 1/28; B66D 3/04; B66D 3/20; B63B 21/26; B63B 21/56; B63B 21/66; B63B 35/00; B63B 23/70; G01V 13/00; G01V 1/3808
USPC ............... 114/244, 253, 254; 367/16, 17, 20
See application file for complete search history.

(56) References Cited

U.S. PATENT DOCUMENTS

| 3,776,516 A | 12/1973 | Daniel |
| 4,023,775 A | 5/1977 | Beattie |
| 6,216,627 B1 * | 4/2001 | Johnsen ................. B63B 21/66 114/244 |
| 6,932,017 B1 * | 8/2005 | Hillesund ............... B63B 21/66 114/244 |
| 7,438,281 B2 * | 10/2008 | Pesnel ..................... B66D 3/04 254/393 |
| 2008/0006802 A1 | 1/2008 | Pesnel |
| 2013/0189036 A1 | 7/2013 | Oldervoll |
| 2014/0314491 A1 | 10/2014 | Fraiche et al. |

FOREIGN PATENT DOCUMENTS

| EP | 1385022 | 1/2004 |
| FR | 2695115 | 3/1994 |
| GB | 2338065 | 12/1999 |

OTHER PUBLICATIONS

Extended European Search Report in EP Application No. 16201767.7 dated Apr. 25, 2017, 13 pages.

* cited by examiner

*Primary Examiner* — Lars A Olson (57) ABSTRACT

Techniques are disclosed relating to marine geophysical prospecting. According to some embodiments, a survey vessel may tow a streamer through a body of water. If the streamer needs to be maintained (e.g., cleaned, repaired, or serviced), a second vessel may lift the streamer out of the water for this purpose. Techniques are disclosed that are relevant to the handling of protruding members (such as streamer steering devices) on the streamer.

19 Claims, 8 Drawing Sheets

MARINE STREAMER HANDLING

CROSS-REFERENCE TO RELATED APPLICATIONS

This application claims priority to U.S. Provisional patent application No. 62/268,077 filed on Dec. 16, 2015, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

In the example of seismic surveying, acoustic waves generated by a seismic source may be transmitted through the water and into the earth's crust, and then reflected back and captured at the towed geophysical sensors along the streamers. Data collected during a marine geophysical survey may be analyzed to locate hydrocarbon-bearing geological structures, and thus determine where deposits of oil and natural gas may be located.

Various challenges may arise in the handling of streamers, for example during maintenance. Embodiments of this disclosure may be used to address some of such challenges, as discussed below.

DETAILED DESCRIPTION

Figure 1:
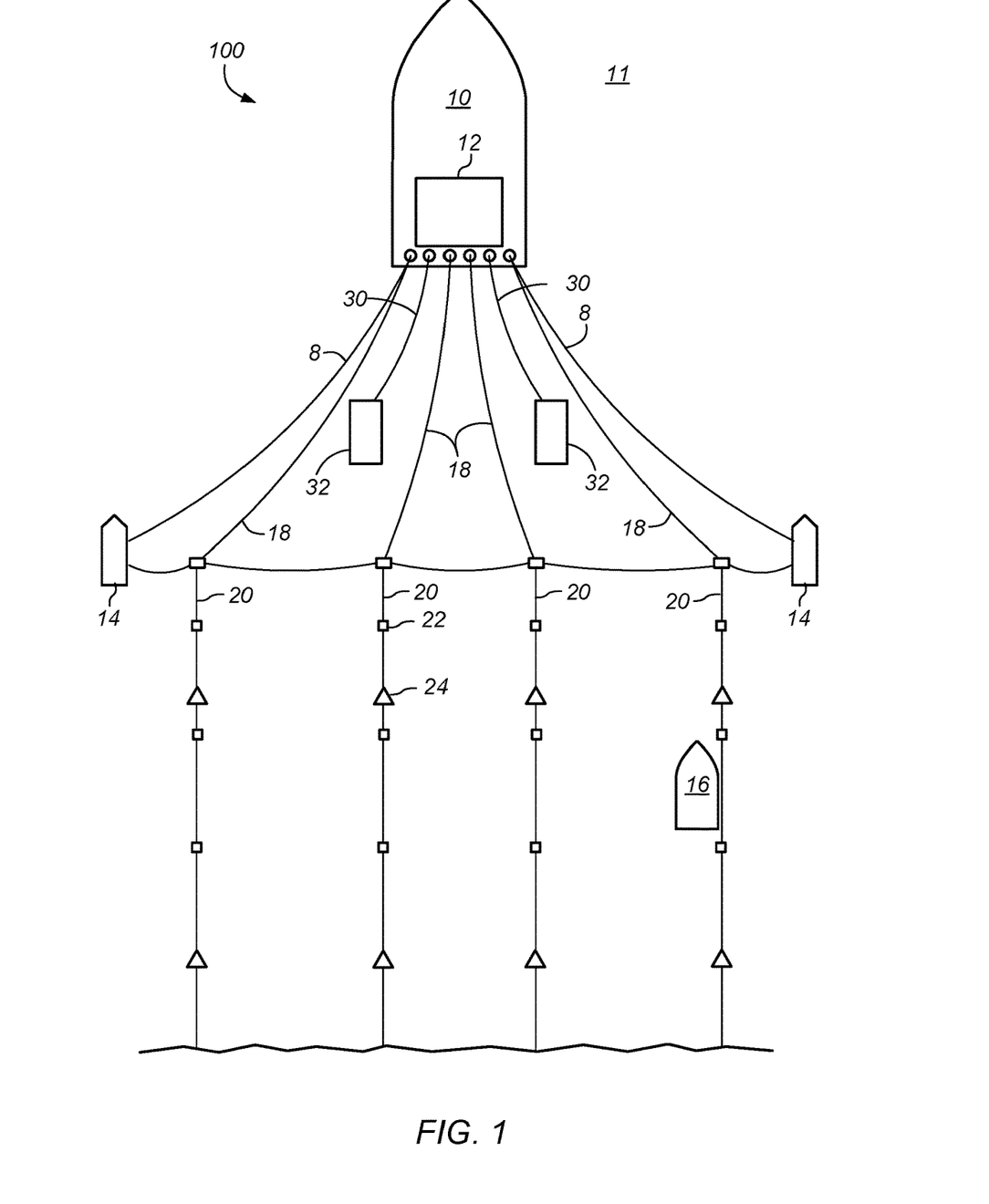
FIG. 1 shows an embodiment of a marine geophysical survey.

This disclosure initially describes, with reference to FIG. 1, an overview of a geophysical survey system. It then describes example streamer handling apparatuses, systems, and methods with reference to FIGS. 2-8. Finally, an example computing system is described with reference to FIG. 9.

Survey Overview

Referring to FIG. 1, an illustration of one embodiment of a geophysical survey system 100 is shown (not necessarily to scale). System 100 includes survey vessel 10 (also referred to as a "first vessel"), signal sources 32, source cables 30, paravanes 14, and streamers 20. (Streamers 20 are shown truncated at the bottom of FIG. 1.) Survey vessel 10 may be configured to move along a surface of body of water 11 such as a lake or ocean. In the illustrated embodiment, survey vessel 10 tows streamers 20, signal sources 32, and paravanes 14, which may be used to provide a desired amount of spread among streamers 20. In other embodiments, streamers 20 may be towed by a separate vessel (not shown), rather than survey vessel 10 that tows signal sources 32.

Streamers 20 may include sensors 22 (e.g., hydrophones, geophones, electromagnetic sensors, etc.). Streamers 20 may further include streamer steering devices 24 (also referred to as "birds") which may provide selected lateral and/or vertical forces to streamers 20 as they are towed through the water, typically based on wings or hydrofoils that provide hydrodynamic lift. Streamers 20 may further include tail buoys (not shown) at their respective back ends. System 100 further includes chase vessel 16 (also referred to as a "second vessel"), which may be used to maintain (e.g., clean, service, or repair) selected elements of system 100 (e.g., streamers 20) as needed. For example, sections of a streamer 20 may be replaced, or auxiliary equipment may be replaced. For example, chase vessel 16 may include devices (discussed in more detail below) to allow streamers 20 to be lifted out of the water as desired.

Sensors 22 on streamers 20 may in some embodiments be disposed within streamers 20 such that they need not protrude outside the surface of streamers 20. Streamer steering devices 24, however, typically include one or more wings (and sometimes additional structures) that protrude beyond the surface of streamers 20. In general, whether caused by sensors 22, streamer steering devices 24, or other auxiliary equipment or structures, some protrusions on streamers 20 typically do exist. As discussed below, these protrusions may cause difficulties when streamer 20 is lifted out of the water by chase vessel 16.

Survey vessel 10 may include equipment, shown generally at 12 and for convenience collectively referred to as a "recording system." Recording system 12 may include devices such as a data recording unit (not shown separately) for making a record with respect to time of signals generated by various geophysical sensors. Recording system 12 may also include navigation equipment (not shown separately), which may be configured to control, determine, and record, at selected times, the geodetic positions of: survey vessel 10, signal sources 32, streamers 20, sensors 22, etc. As illustrated in FIG. 1, streamers 20 are coupled to survey vessel 10 via cables 18.

Geodetic position (or "position") of the various elements of system 100 may be determined using various devices, including navigation equipment such as relative acoustic ranging units and/or global navigation satellite systems (e.g., a global positioning system (GPS)).

Each of signal sources 32 may include sub-arrays of multiple individual signal sources. For example, a signal source 32 may include a plurality of air guns, marine vibrators, or electromagnetic signal sources. In various embodiments, a geophysical survey system may include any appropriate number of towed signal sources 32 and streamers 20.

Various techniques may be used to analyze the data collected from system 100. Some such techniques are discussed in U.S. Pat. No. 7,684,281, which is hereby incorporated by reference in its entirety.

In some embodiments, various items of information relating to geophysical surveying, such as data collected by sensors, may be embodied in a "geophysical data product." A geophysical data product may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, flash memory, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored as the geophysical data product. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States. Once onshore in the United States, geophysical analysis may be performed on the geophysical data product.

Example Embodiments

As noted above, in various situations it may be desirable to perform maintenance (such as cleaning, repair, or other service) on a streamer in the water. Typically, a chase vessel separate from the survey vessel towing the streamer may be employed for this purpose.

It may be feasible for a chase vessel to move inside a spread of streamers by traveling above the individual streamers. For streamers towed at a shallow depth (e.g., up to a few meters), a small chase vessel may be used. For streamers towed deeper (e.g., 15-20 meters), it may be possible to use a relatively large chase vessel. Some embodiments of the present disclosure include tools on a chase vessel that can be used for picking up a streamer to a workable height, such as above the surface of the water. Once the streamer is picked up, a streamer handler (discussed in more detail below) may allow the chase vessel to traverse the streamer.

Within the context of this disclosure, "traversing" a streamer may include traversing based on the motion of the streamer, or the motion of the chase vessel, or both. In general, it is the relative motion between the streamer and the chase vessel that is referred to as traversing. In various embodiments, a streamer may be traversed from front to back or from back to front. In various embodiments, a chase vessel may traverse a streamer such that the streamer travels either forward or backward relative to the chase vessel.

Figure 2:
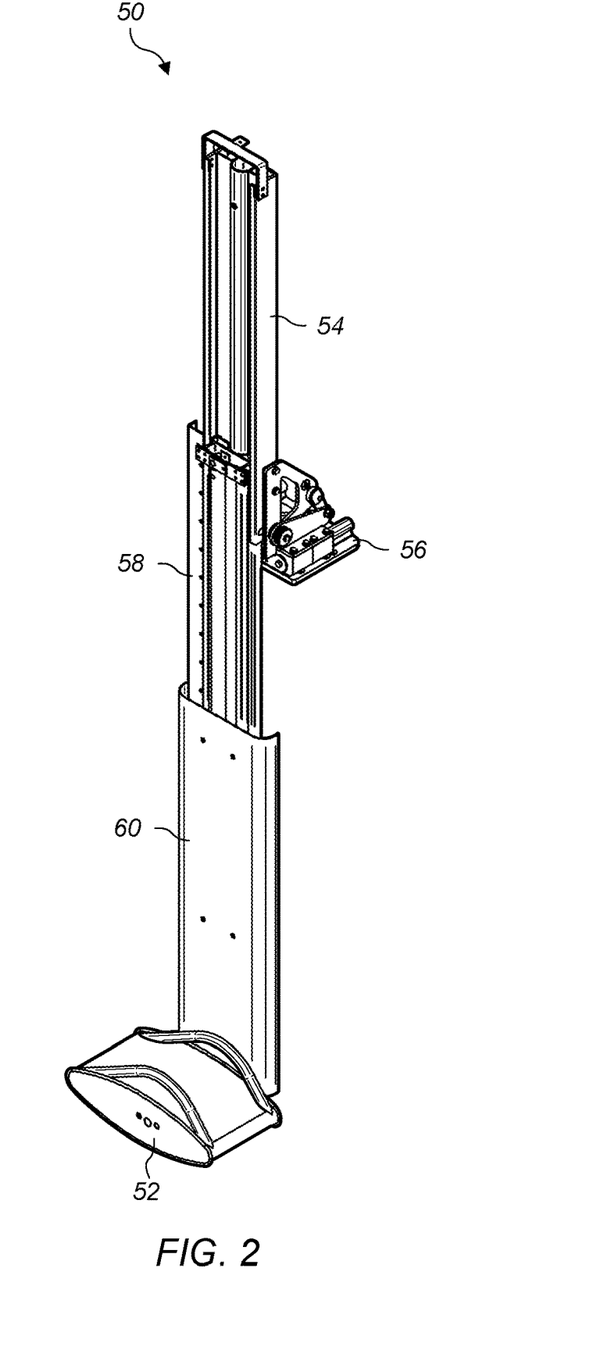
FIG. 2 shows an embodiment of a streamer handler.

Turning now to FIG. 2, streamer handler 50 is shown. Streamer handler 50 may be affixed via connector 56 to the side of a chase vessel and used to support a streamer (not shown) on top of head 52 at a selected height above the surface of the water for maintenance.

In some embodiments, a separate device such as a crane or winch including a grappling hook (not shown) may perform the initial lifting of the streamer onto head 52. For example, a powered grappling hook (e.g., powered via an onboard propeller or turbine) may include a camera to allow an operator to guide it to the streamer to be picked up.

Head 52 may include various devices to allow the streamer to move smoothly as the chase vessel traverses it. For example, a conveyor belt (either powered or unpowered) may be placed on top of head 52. In other embodiments, chains, pulleys, wheels, a fulcrum, an edge, a roller, and/or a channel may be used to aid the streamer in traversing over head 52.

As shown in FIG. 2, connector 56 may affix streamer handler 50 to the chase vessel such that bracket 54 is not movable relative to the chase vessel's hull. Brackets 58 and/or 60, however, may be configured to slide up and down relative to bracket 54, such that head 52 may be placed at a desired height for streamer maintenance. A motor (not shown) may be used to cause brackets 58 and/or 60 to slide up or down to adjust the height of head 52.

A drawback of streamer handler 50 is that it does not have an efficient way of dealing with any protruding members that may be present in or on the streamer. For example, streamer steering devices may protrude significantly from the profile of the streamer, and thus it may become problematic for head 52 to traverse a portion of a streamer that includes a streamer steering device. One way of dealing with such a situation is to remove the streamer from head 52 (e.g., by placing it back in the water), then traverse past the protruding member, and then finally place the streamer back onto head 52. This method may be somewhat time-consuming, however.

Figure 3:
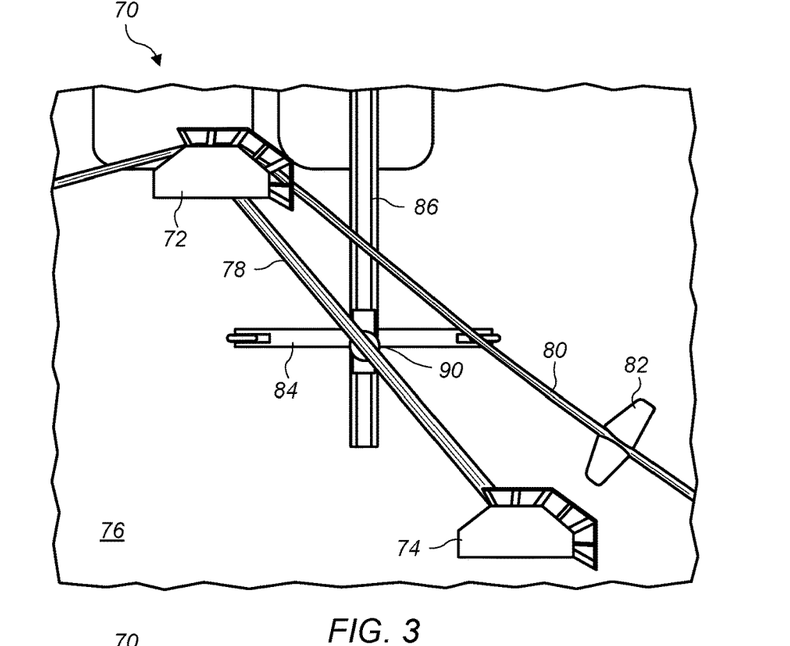
FIGS. 3-4 show an embodiment of another streamer handler in operation.
Figure 4:
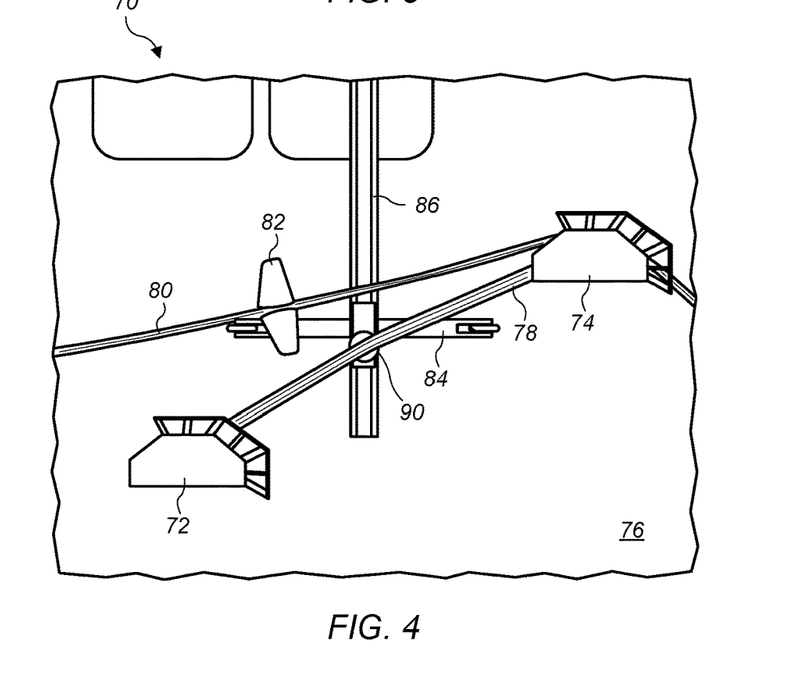

Turning now to FIGS. 3 and 4, another embodiment of a streamer handler is shown that may be more efficient at dealing with protruding members on a streamer. Streamer handler 70 is affixed (or affixable) to the side of the hull of chase vessel 76 (only a portion of which is shown). Streamer handler 70 includes two separate streamer handling blocks 72 and 74. Streamer handling blocks 72 and 74 are connected by rotatable member 78, which may be rotated about fulcrum 90. Rotatable member 78 may in some embodiments be a straight beam, but in other embodiments need not be straight. For example, the two "arms" of rotatable member 78 may be angled away from the chase vessel (e.g., out of the plane of the page) to provide additional clearance for the streamer relative to the hull of the chase vessel. In other embodiments, the two arms may be at an angle relative to one other within the plane of the page. Streamer handling blocks 72 and 74 may be at opposite ends of rotatable member 78 in some embodiments.

As shown in FIGS. 3 and 4, streamer 80 is traversing from the right to the left (or equivalently, chase vessel 76 is traversing from left to right). Streamer 80 includes streamer steering device 82. In FIG. 3, streamer handling block 72 is in an upward position, and streamer handling block 74 is in a downward position. Streamer 80 thus rests on streamer handling block 72 as it traverses from right to left.

Once streamer steering device 82 has traveled far enough to be in between streamer handling block 72 and streamer handling block 74, streamer handler 70 may cause rotatable member 78 to rotate such that streamer handling block 74 moves upward, and streamer handling block 72 moves downward. Thus, streamer 80 may come to rest on streamer handling block 74, as shown in FIG. 4. In general, rotatable member 78 may be rotated based on the position of streamer steering device 82.

Typically, once streamer steering device 82 has passed beyond streamer handling block 72, rotatable member 78 may be rotated back into the position shown in FIG. 3. In this manner, streamer handler 70 may be prepared for when the next protruding member (if any) is encountered. To rotate back into the position shown in FIG. 3, rotatable member 78 may either rotate back in the opposite direction, or it may continue in the same direction to complete a full revolution.

In one embodiment, the rotation of rotatable member 78 may be performed automatically by control circuitry (not shown) coupled to rotatable member 78. For example, sensors may be used to detect the position of streamer steering device 82 (or other protrusions). For example, streamer steering device 82 may be detected visually, or by a magnetic sensor, or by measuring a length of streamer 80 that has been traversed, or via any other suitable method. Once the control circuitry has detected that streamer steering device 82 is in position between streamer handling block 72 and streamer handling block 74, rotatable member 78 may be moved via a hydraulic actuator, a pneumatic actuator, an electric motor, or any other suitable mechanism.

In some embodiments, the rotation of rotatable member 78 may be performed manually by an operator with a manual adjustment mechanism. That is, in one embodiment, an operator may physically and manually rotate rotatable member 78. In another embodiment, an operator may determine that streamer steering device 82 is in position, and then cause a powered mechanism to rotate rotatable member 78.

In some embodiments, the traversal of streamer 80 across streamer handler 70 may be paused momentarily while rotatable member 78 rotates. In other embodiments, streamer 80 may continue to traverse while rotatable member 78 rotates.

As shown in FIGS. 3 and 4, streamer handler 70 may be affixed to vertical strut 86 and horizontal strut 84. Streamer handler 70 may thus be translated into a desired position during operation by moving along vertical strut 86 and/or horizontal strut 84. One such situation is described in more detail with reference to FIG. 5 below.

In some embodiments, streamer handling blocks 72 and 74 may be similar in construction to head 52 from streamer handler 50. In particular, various methods for allowing a streamer to traverse smoothly over streamer handling blocks 72 and 74 will be understood by one of ordinary skill in the art with the benefit of this disclosure. In some embodiments, streamer handling blocks 72 and 74 may be identical to one another, or they may be of different constructions.

Figure 5:
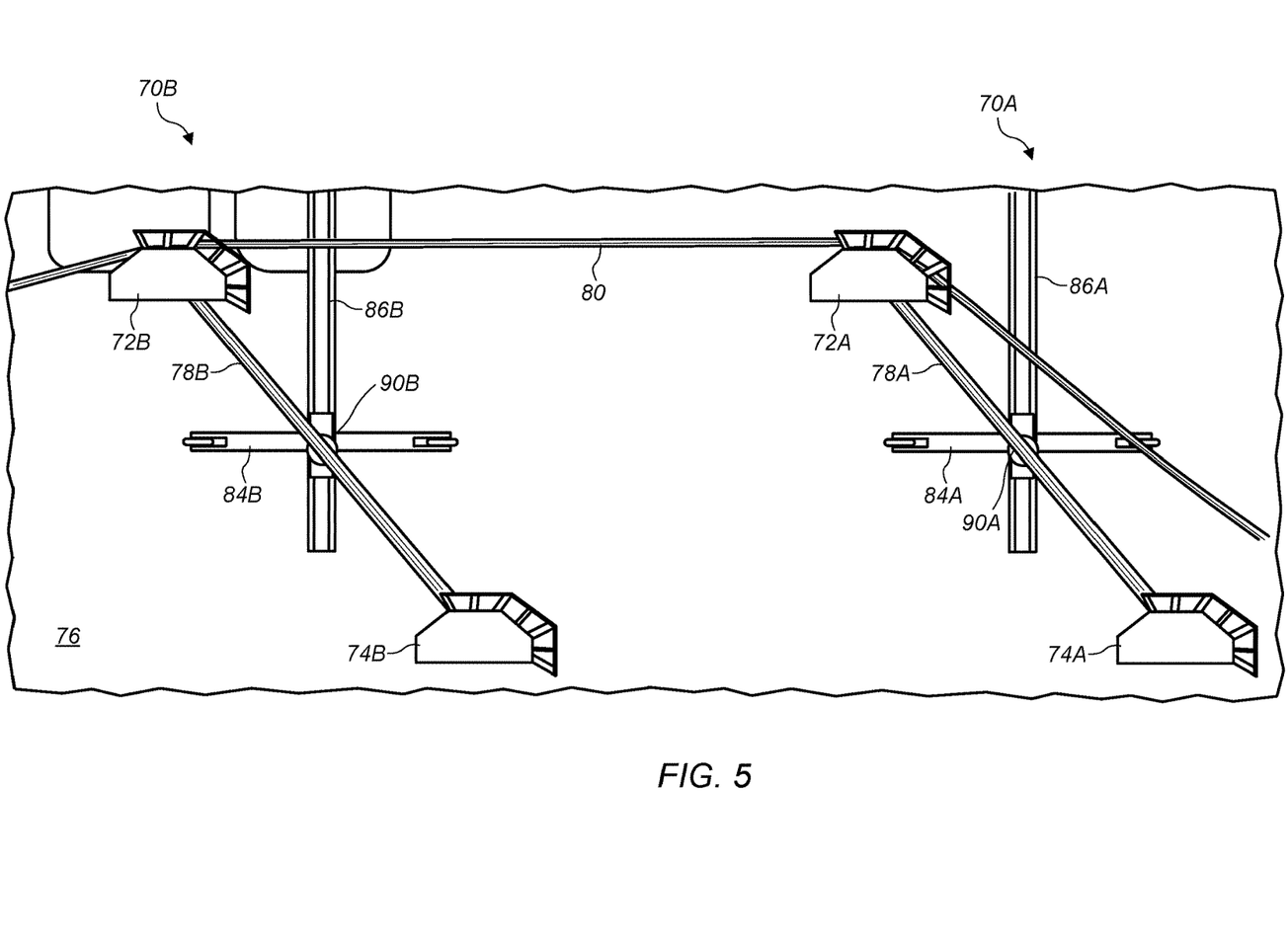
FIG. 5 shows an embodiment of a pair of streamer handlers.

Turning now to FIG. 5, an embodiment is shown in which two separate examples of streamer handler 70 are present. Such an embodiment may be used to provide additional support for streamer 80, to prevent streamer 80 from getting caught underneath the hull of chase vessel 76, etc. The two separate streamer handlers 70 may be controlled separately or by a common control system. The reference numerals and elements shown in FIG. 5 are similar to those in FIGS. 3 and 4, but with a letter appended. So, for example, streamer handler 70A refers to the right streamer handler, and streamer handler 70B refers to the left streamer handler.

As will be understood by one of ordinary skill in the art with the benefit of this disclosure, a typical operation of the system in FIG. 5 may be as follows. As a streamer steering device or other protruding member (not shown) approaches from the right and passes streamer handling block 74A, streamer handler 70A may actuate to cause rotatable member 78A to rotate. This action may transfer streamer 80 from streamer handling block 72A onto streamer handling block 74A. As the streamer steering device or other protruding member then passes streamer handling block 74B, streamer handler 70B may actuate to cause rotatable member 78B to rotate. This action may transfer streamer 80 from streamer handling block 72B onto streamer handling block 74B. After the streamer steering device or other protruding member has passed each respective streamer handler, the respective rotatable members may be rotated back to their original positions in due course to prepare for the next protruding member.

In various embodiments, one, two, or more than two separate streamer handlers may be used. Typically, in cases where multiple streamer handlers are used, they may be arranged in a line along the side of a chase vessel, as shown in FIG. 5. Other arrangements will be apparent to one of ordinary skill in the art with the benefit of this disclosure.

According to some embodiments, it may be advantageous for streamer handlers 70A and 70B to be configured to move relative to one another. The arrangement with vertical struts 86A and 86B and horizontal struts 84A and 84B may be used to effect this. For example, when a streamer is first being loaded onto streamer handlers 70A and 70B, it may be advantageous for the handlers to be close together to aid in alignment. Once the streamer is placed onto the handlers, they may be spread farther apart for purposes of stability.

Various modifications to the streamer handlers of this disclosure will be apparent to one of ordinary skill in the art with the benefit of this disclosure. Such modifications may be used singly or with multiple separate handlers, as discussed above with reference to FIG. 5. One embodiment of such a modification is shown in FIG. 6.

Figure 6:
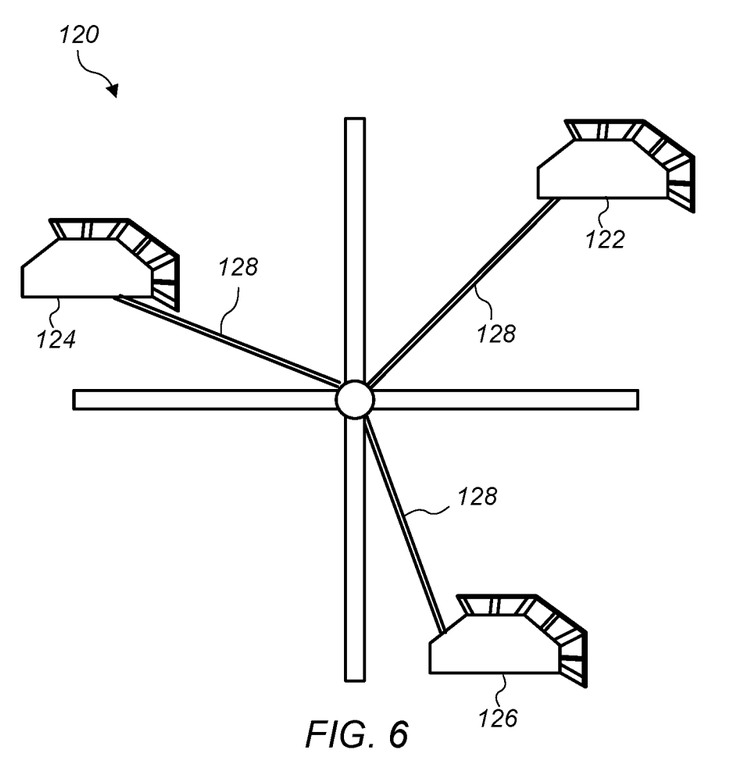
FIG. 6 shows an embodiment of a different streamer handler.

FIG. 6 shows streamer handler 120. Streamer handler 120 is generally similar to streamer handler 70, but with three streamer handling blocks instead of two. In particular, streamer handler 120 includes streamer handling blocks 122, 124, and 126. Streamer handling blocks 122, 124, and 126 are supported by rotatable members 128. The streamer handling blocks may be mounted at 120° angles to one another as shown, or in any other desired arrangement. Any suitable number of streamer handling blocks may be used; three are shown merely as a possible embodiment in this figure.

As a streamer traverses streamer handler 120 from right to left, rotatable members 128 may rotate counterclockwise (from the perspective of the figure). For example, as a protruding member is positioned between streamer handling blocks 122 and 126, rotatable members 128 may rotate counterclockwise to support the streamer on streamer handling block 126. Later, when another protruding member approaches, rotatable members 128 may rotate counterclockwise again to transfer the streamer from streamer handling block 126 to streamer handling block 124. In some embodiments, such a streamer handler may be configured to rotate in only a single direction, as opposed to streamer handler 70, which may be configured to rotate back and forth.

Figure 7:
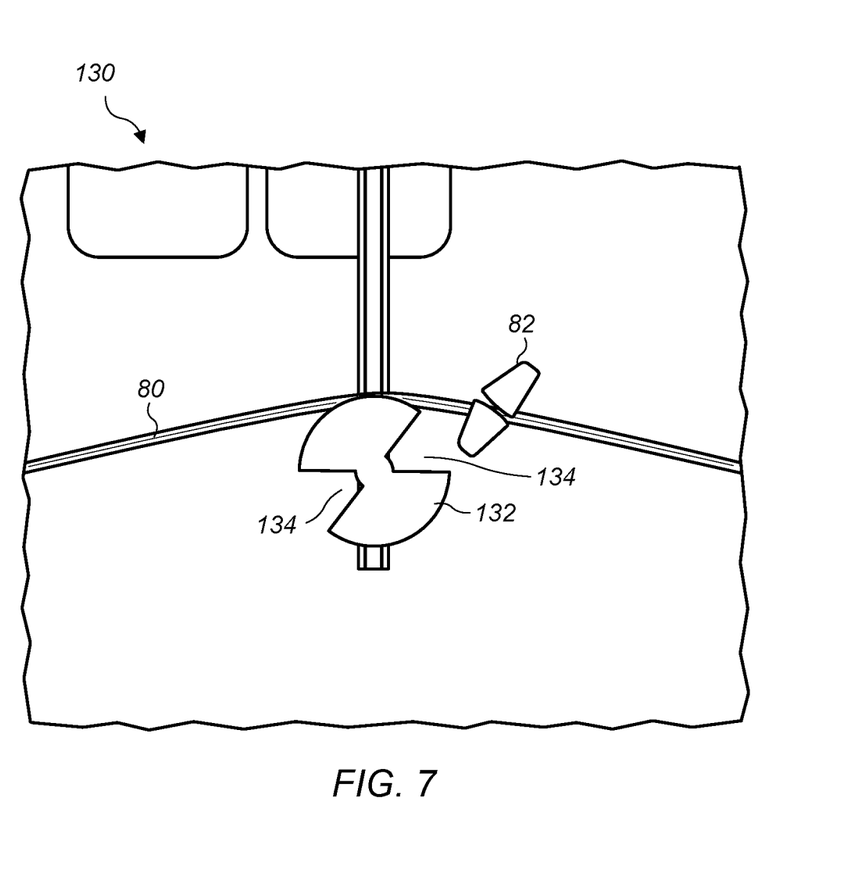
FIG. 7 shows an embodiment of another different streamer handler.

Turning now to FIG. 7, yet another embodiment is shown. Streamer handler 130 includes rotatable member 132, which has a circular profile and includes one or more depressions 134 configured to accept a streamer steering device or other protruding member. In this embodiment, two such depressions are shown. One of ordinary skill in the art will understand that one such depression may be sufficient, or that any desired number of depressions may be used in a particular embodiment.

As streamer 80 traverses streamer handler 130 from right to left, streamer steering device 82 approaches rotatable member 132. Rotatable member 132 may be rotated such that one of depressions 134 is aligned to accept streamer steering device 82. Rotatable member 132 may then rotate with the traversal of streamer 80 to allow streamer steering device 82 (or any other protruding member) to traverse without interference.

When no streamer steering device 82 is approaching rotatable member 132, rotatable member 132 may either be fixed in place or allowed to rotate with the movement of streamer 80. For example, the outer portions of rotatable member 132 may include a conveyor belt or other mechanism for allowing streamer 80 to move smoothly over them; in such a situation, rotatable member 132 may be fixed in place until streamer steering device 82 approaches. In other embodiments, rotatable member 132 may be allowed to rotate freely until streamer steering device 82 approaches, at which point its rotational orientation may be adjusted so that depression 134 may be oriented to accept streamer steering device 82 when streamer steering device 82 arrives.

Figure 8:
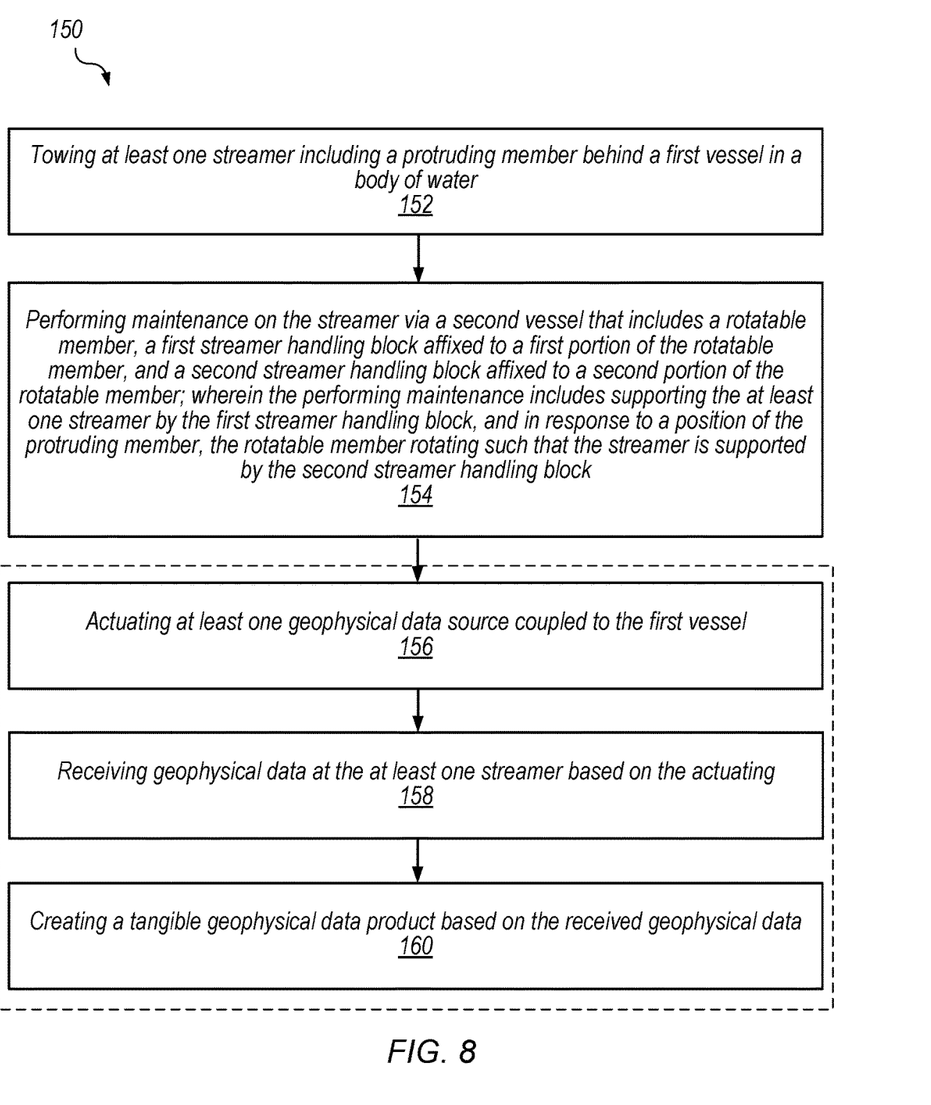
FIG. 8 shows a flow diagram of an example method.

Turning now to FIG. 8, an example method 150 according to this disclosure is shown. Flow begins at step 152.

At step 152, at least one streamer is towed behind a first vessel in a body of water. The at least one streamer includes a protruding member, such as a streamer steering device. Flow proceeds to step 154.

At step 154, maintenance is performed on the streamer via a second vessel. Such maintenance may include, without limitation, cleaning, repairing, or servicing of the streamer. The second vessel includes a rotatable member, a first streamer handling block affixed to a first portion of the rotatable member, and a second streamer handling block affixed to a second portion of the rotatable member.

The second vessel may be configured to traverse the streamer. Initially at step 154, the streamer is supported by the first streamer handling block, and in response to a position of the protruding member, the rotatable member rotates such that the streamer is supported by the second streamer handling block. For example, it may be detected that the protruding member has reached a position between the first and second streamer handling blocks. Based on this detection, the rotatable member may be rotated to move the streamer from the first streamer handling block to the second streamer handling block.

In some embodiments, method 150 may also include steps 156, 158, and 160 (shown in a dashed box). In such embodiments, flow proceeds to step 156. Otherwise, flow ends at step 154.

At step 156, maintenance has been completed, and a geophysical signal source is actuated at the first vessel. For example, an air gun or a marine vibrator coupled to the first vessel may be actuated. Flow proceeds to step 158.

At step 158, geophysical data is received at a streamer based on the actuating of the geophysical signal source. For example, the geophysical signal source may produce seismic waves that travel through the water and into the subsea formations, and then reflect back to various sensors that may be arranged along the streamer. The received signals may be referred to as "geophysical data." Flow proceeds to step 160.

At step 160, a tangible geophysical data product is created based on the received geophysical data. For example, raw analog data from the streamer may be stored as the geophysical data product. In another embodiment, a digitized and/or conditioned version of the data may be stored as the geophysical data product. In yet another embodiment, the data may be fully processed into a two- or three-dimensional map of the various geophysical structures before being stored as the geophysical data product.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 9:
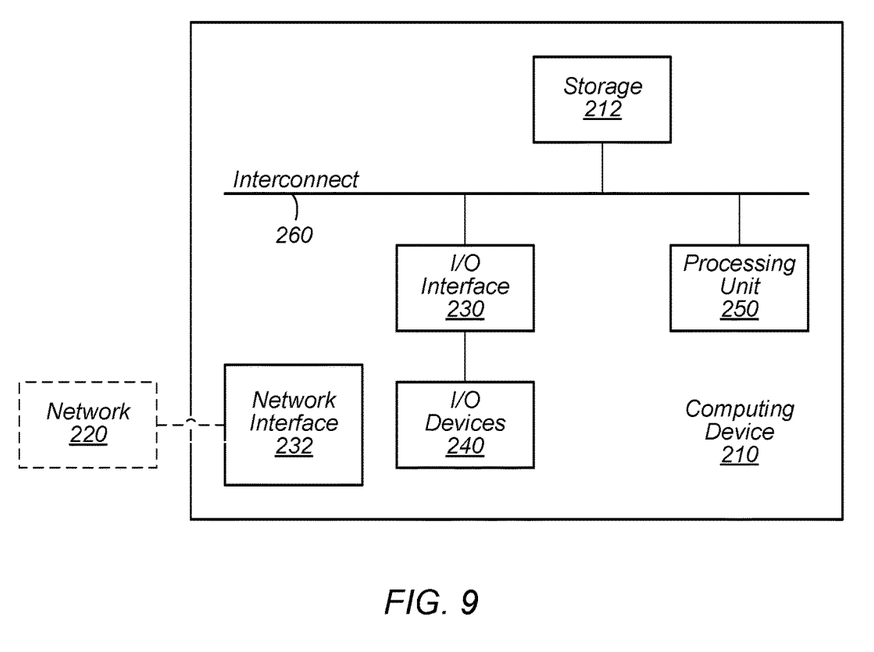
FIG. 9 shows a block diagram illustrating an example computing system.

Turning now to FIG. 9, a block diagram of a computing device (which may also be referred to as a computing system) 210 is depicted, according to some embodiments. Computing device 210 may be used to implement various portions of this disclosure. Computing device 210 is one example of a device that may be used as a mobile device, a server computing system, a client computing system, or any other computing system implementing portions of this disclosure.

Computing device 210 may be any suitable type of device, including, but not limited to, a personal computer system, desktop computer, laptop or notebook computer, mobile phone, mainframe computer system, web server, workstation, or network computer. As shown, computing device 210 includes processing unit 250, storage subsystem 212, input/output (I/O) interface 230 coupled via interconnect 260 (e.g., a system bus). I/O interface 230 may be coupled to one or more I/O devices 240. Computing device 210 further includes network interface 232, which may be coupled to network 220 for communications with, for example, other computing devices.

As described above, processing unit 250 includes one or more processors. In some embodiments, processing unit 250 includes one or more coprocessor units. In some embodiments, multiple instances of processing unit 250 may be coupled to interconnect 260. Processing unit 250 (or each processor within processing unit 250) may contain a cache or other form of on-board memory. In some embodiments, processing unit 250 may be implemented as a general-purpose processing unit, and in other embodiments it may be implemented as a special purpose processing unit (e.g., an ASIC). In general, computing device 210 is not limited to any particular type of processing unit or processor subsystem.

As used herein, the terms "processor," "processing unit," or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 212 is usable by processing unit 250 (e.g., to store instructions executable by and data used by processing unit 250). Storage subsystem 212 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 212 may consist solely of volatile memory in some embodiments. Storage subsystem 212 may store program instructions executable by computing device 210 using processing unit 250, including program instructions executable to cause computing device 210 to implement the various techniques disclosed herein.

I/O interface 230 may represent one or more interfaces and may be any of various types of interfaces configured to couple to and communicate with other devices, according to various embodiments. In some embodiments, I/O interface 230 is a bridge chip from a front-side to one or more back-side buses. I/O interface 230 may be coupled to one or more I/O devices 240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for [performing a function]" construct.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a rotatable member affixable to a vessel;
   a first streamer handling block affixed to a first portion of the rotatable member; and
   a second streamer handling block affixed to a second portion of the rotatable member;
   wherein the apparatus is configured to:
      support the streamer by the first streamer handling block, wherein the streamer includes a protruding member; and
      in response to a change in position of the protruding member caused by horizontal traversal by the streamer of the first streamer handling block, rotate the rotatable member to support the streamer by the second streamer handling block for horizontal traversal by the streamer of the second streamer handling block, wherein the apparatus is configured to rotate the rotatable member without the protruding member contacting either the first streamer handling block or the second streamer handling block.

2. The apparatus of claim 1, wherein the protruding member is a streamer steering device.

3. The apparatus of claim 1, wherein the first streamer handling block includes a conveyor belt configured to convey the streamer.

4. The apparatus of claim 3, wherein the conveyor belt is a powered conveyor belt.

5. The apparatus of claim 1, further comprising control circuitry configured to rotate the rotatable member automatically in response to the change in position of the protruding member.

6. The apparatus of claim 1, further comprising a manual adjustment mechanism configured to rotate the rotatable member.

7. The apparatus of claim 1, wherein the first streamer handling block and the second streamer handling block are at opposite ends of the rotatable member, and wherein the apparatus is configured to rotate the rotatable member in response to the protruding member being between the first streamer handling block and the second streamer handling block.

8. The apparatus of claim 1, wherein the apparatus includes a third streamer handling block.

9. The apparatus of claim 8, wherein the rotatable member is configured to be rotated in only a single direction.

10. The apparatus of claim 1, wherein the rotatable member is affixed to the vessel and is movable vertically relative to the vessel.

11. The apparatus of claim 10, wherein the rotatable member is movable horizontally relative to the vessel.

12. The apparatus of claim 1, further comprising:
a second rotatable member affixable to the vessel;
a third streamer handling block affixed to a first portion of the second rotatable member; and
a fourth streamer handling block affixed to a second portion of the second rotatable member;
wherein the apparatus is further configured to support the streamer by the third streamer handling block; and
wherein, in response to a change in position of the protruding member, the apparatus is further configured to rotate the second rotatable member to support the streamer by the fourth streamer handling block.

13. An apparatus, comprising:
a rotatable member affixable to a vessel;
wherein the apparatus is configured to, while a streamer is towed behind a vessel in a body of water:
support a streamer by the rotatable member, the streamer including a protruding member; wherein the rotatable member includes at least one depression therein that is configured to accept the protruding member of the streamer; and
in response to a change in position of the protruding member caused by horizontal traversal by the streamer of the rotatable member while the streamer is towed behind the vessel in a body of water, rotate the rotatable member to receive the protruding member in the depression.

14. The apparatus of claim 13, wherein the rotatable member has a circular profile.

15. The apparatus of claim 13, wherein the rotatable member includes at least two depressions configured to accept the protruding member of the streamer.

16. The apparatus of claim 13, wherein the apparatus is affixed to the vessel.

17. A method, comprising:
towing at least one streamer including a protruding member behind a first vessel in a body of water; and
performing maintenance on the at least one streamer via a second vessel in the body of water, the second vessel including a rotatable member, a first streamer handling block affixed to a first portion of the rotatable member, and a second streamer handling block affixed to a second portion of the rotatable member, wherein the performing maintenance includes:
supporting the at least one streamer by the first streamer handling block; and
in response to a position of the protruding member, the rotatable member rotating such that the streamer is supported by the second streamer handling block.

18. The method of claim 17, further comprising:
actuating at least one geophysical signal source coupled to the first vessel;
receiving geophysical data at the at least one steamer based on the actuating; and
creating a tangible geophysical data product based on the receiving geophysical data.

19. The method of claim 18, wherein the creating the tangible geophysical data product includes storing the received geophysical data on the tangible geophysical data product.

* * * * *